United States Patent [19]

Grinde

[11] Patent Number: 4,561,518

[45] Date of Patent: Dec. 31, 1985

[54] RECREATIONAL VEHICLE WITH LIMITED DIFFERENTIAL

[75] Inventor: James E. Grinde, Anoka, Minn.

[73] Assignee: Yamaha Hatsudoki Kabushiki Kaisha, Iwata, Japan

[21] Appl. No.: 559,714

[22] Filed: Dec. 9, 1983

Related U.S. Application Data

[63] Continuation-in-part of Ser. No. 346,136, Feb. 5, 1982, abandoned.

[51] Int. Cl.[4] .............................................. B62K 5/04
[52] U.S. Cl. ..................................... 180/215; 74/650; 180/217
[58] Field of Search .................. 180/215, 217, 76; 74/650

[56] References Cited

U.S. PATENT DOCUMENTS

| 1,933,101 | 10/1933 | DuPont et al. | 180/217 X |
| 3,359,803 | 12/1967 | Long | 74/650 |
| 3,397,593 | 8/1968 | Knoblock | 74/650 |
| 3,650,344 | 3/1972 | Plessinger | 180/217 |

Primary Examiner—John A. Pekar
Attorney, Agent, or Firm—Orrin M. Haugen; Thomas J. Nikolai

[57] ABSTRACT

An off-the-road vehicle having at least two rear wheels mounted on axles which are journaled for rotation within the housing of a torque transfer type differential whereby drive power from the motor is coupled to the slower rotating one of the two rear axles.

4 Claims, 4 Drawing Figures

RECREATIONAL VEHICLE WITH LIMITED DIFFERENTIAL

CROSS-REFERENCE TO RELATED APPLICATIONS

This application is a continuation-in-part of application Ser. No. 346,136, filed Feb. 5, 1982, now abandoned.

BACKGROUND OF THE INVENTION

1. Field of the Invention

This invention relates generally to sports or recreational vehicles of the type which may be driven off the road, and more specifically to a vehicle incorporating a limited-type differential whereby the maneuverability of the vehicle, including its starting and stopping is enhanced.

2. Discussion of the Prior Art

Over the past decade or so there has been a great upsurge in the popularity of motor vehicles which may be operated over rough terrain, in snow or on ice, or on blacktop pavement as well. Typical of such a vehicle in which the present invention finds use is the TRI-MOTO ® three-wheeled motorized unit manufactured and sold by Yamaha Motor Company, Ltd. of Japan. This vehicle comprises a frame having a front fork which supports a single, relatively large size, inflatable balloon tire which may be turned for steering purposes by means of handlebars. The two rear wheels are mounted on a common axle and the axle carries a sprocket which is chain-driven by a motor also carried by the frame.

In this prior art three-wheeled vehicle identified above, a problem is often encountered in cornering. That is, when it desired to round a corner, the driver must be sufficiently skilled and familiar with the use of the vehicle to lean properly toward the outside wheel. The natural tendency is for an untrained driver to lean into the turn, but such a maneuver is ineffective and actually makes turning more difficult. As a result, tire wear is increased and the ground surface on which the vehicle is being used will be scuffed.

One solution to the foregoing problem is to replace the fixed single axle arrangement with a double axle, the two axles being joined by a conventional differential gear train. When using a such differential gear train during a turn, the inside wheel and outside wheel are able to rotate at different speeds, thus facilitating the turning operation. However, in an all-terrain vehicle of the type described, a conventional differential presents other problems that render its use impractical. As is well-known in the art, with a conventional differential gear train joining the two axles, if one wheel is free to spin, such as might occur in snow or on ice or when traveling through sand or mud, the other wheel loses traction. Thus, the vehicle will tend to become mired.

The KLT three-wheeled vehicle manufactured by the Kawasaki Company uses a dual mode differential in coupling the two rear axles together. Thus, when driving on dry pavement or solid ground, the unit functions as a standard differential, thus accommodating the steering and cornering. Should the vehicle become bogged down either in sand, mud, or snow, the driver may choose to turn off the engine, dismount from the vehicle and use a special wrench on the differential to lock the two axles together so that the unit functions as a single axle and providing the desired torque on each wheel to allow it to be moved from its mired condition.

In accordance with the teachings of the present invention, the drawbacks of the prior art are obviated through the use of a limited differential, preferably of the torque transfer type. When such a device is used for coupling the two rear axles together, more of the torque or driving force is applied to the wheel which is turning at the lower rotational velocity. Thus, when cornering, the majority of the driving torque is applied to the inside wheel and the outside wheel turns freely at a rate determined by the vehicle's speed and the turning radius involved. Thus, steering and maneuverability typical of a standard differential drive is provided. In the event that the vehicle encounters soft ground or snow and ice, and a torque transfer type limited differential is used, should one wheel begin to spin, all of the driving torque is automatically transferred to the wheel which happens to be moving at a lower angular velocity. Thus, power is supplied to one wheel or the other or to both automatically, depending on whether they are rotating at different speeds or at the same speed respectively.

The use of a torque transfer type limited differential affords still a further advantage as it relates to the braking of the vehicle. When using a standard differential, it is necessary to provide drum shoes or disc and caliper brakes on each of the two axles if stopping without pulling to one side is to be accomplished. When using a torque transfer type differential unit as in the present invention, only a single disc and caliper assembly is required. Upon application of the brakes, the braking force will be applied either uniformly to both wheels, provided they are both moving at the same rotational velocity, or to the particular wheel which is moving at the slower rotational velocity. Then, when speed equilibrium between the two wheels is reached, the applied braking force is distributed equally between the two wheels.

OBJECTS

It is accordingly a principle object of the present invention to provide an improved drive arrangement in an all-terrain vehicle.

Another object of the invention is to provide a drive arrangement for a three-wheeled all-terrain vehicle whereby its maneuverability and traction in differing road conditions is enhanced.

Still another object of the invention is to provide an all-terrain vehicle utilizing a torque transfer type differential drive for its drive wheels.

Yet another object of the invention is to provide an all-terrain vehicle utilizing a torque transfer type differential whereby the braking mechanism used with the vehicle may be simplified.

These and other objects and advantages of the invention will become apparent to those skilled in the art from the following detailed description of a preferred embodiment when considered in conjunction with the accompanying drawings in which like numerals in the several views refer to corresponding parts.

DESCRIPTION OF A FIRST PREFERRED EMBODIMENT

Figure 1:
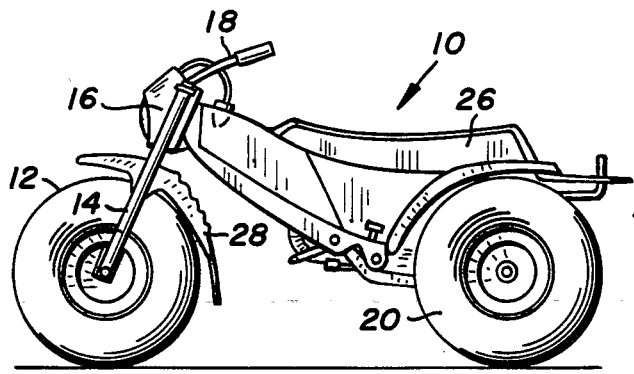
FIG. 1 is a side elevation of a typical all-terrain vehicle embodying the present invention.
Figure 2:
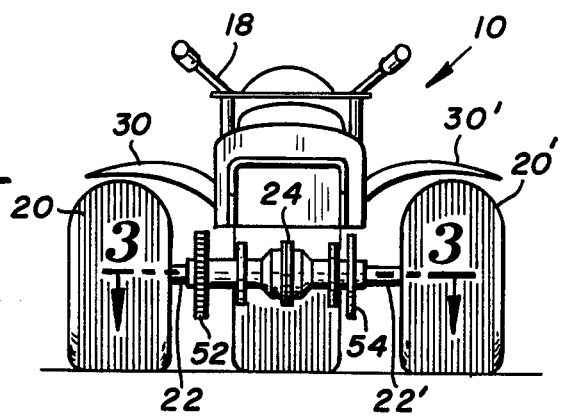
FIG. 2 is a rear view of the vehicle of FIG. 1.

Referring first to FIG. 1, there is identified generally by the numeral 10 an off-the-road vehicle of the type in which the present invention finds use. For purposes of illustration only, it is represented as a three-wheeled vehicle having a relatively large diameter and width balloon tires on each of its three wheels. The front tire 12 is journaled to a fork 14 which, in turn, passes through the neck 16 on the vehicles frame. Handlebars 18 are coupled to the fork so that the front wheel 12 may be rotated about a generally vertical axis.

Figure 3:
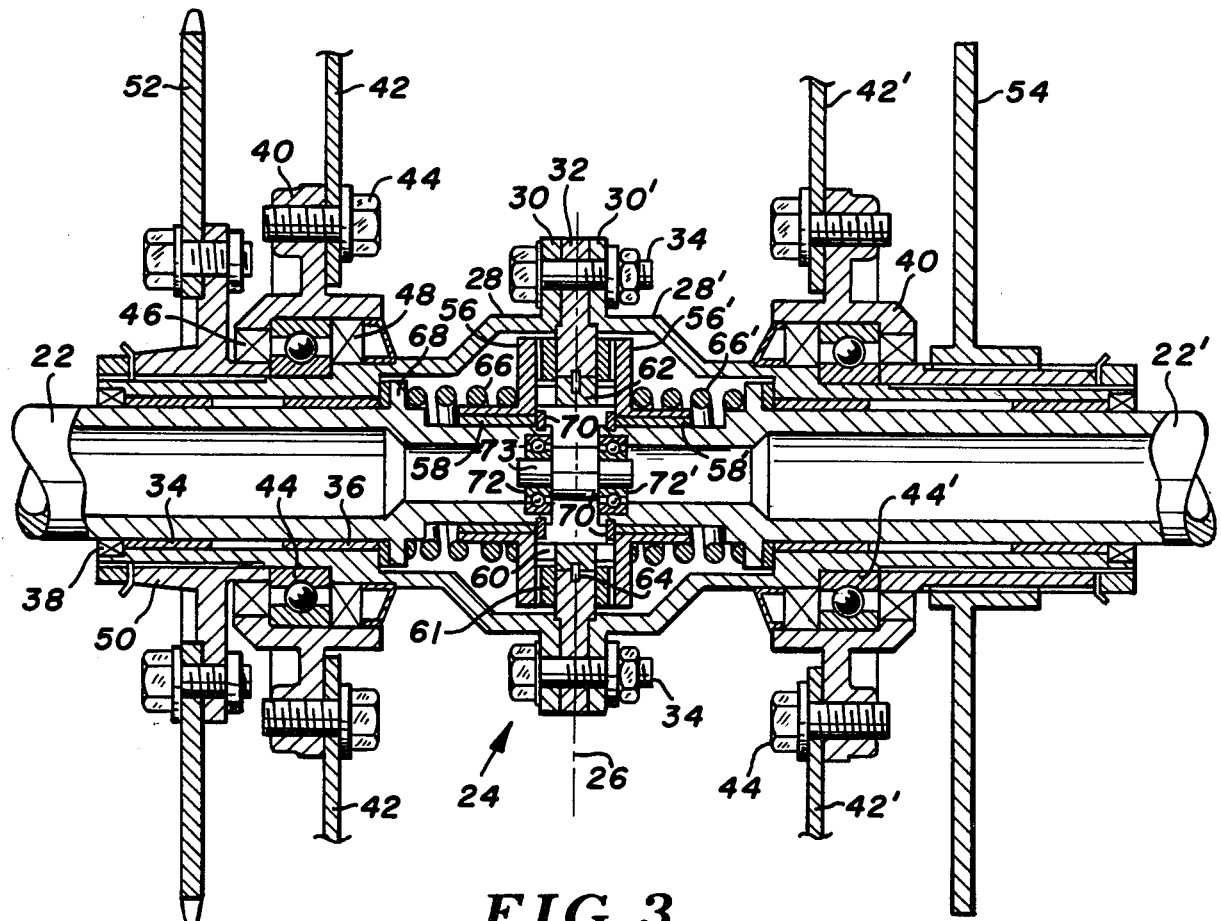
FIG. 3 is a cross-section view of the drive train embodying the present invention.
Figure 4:
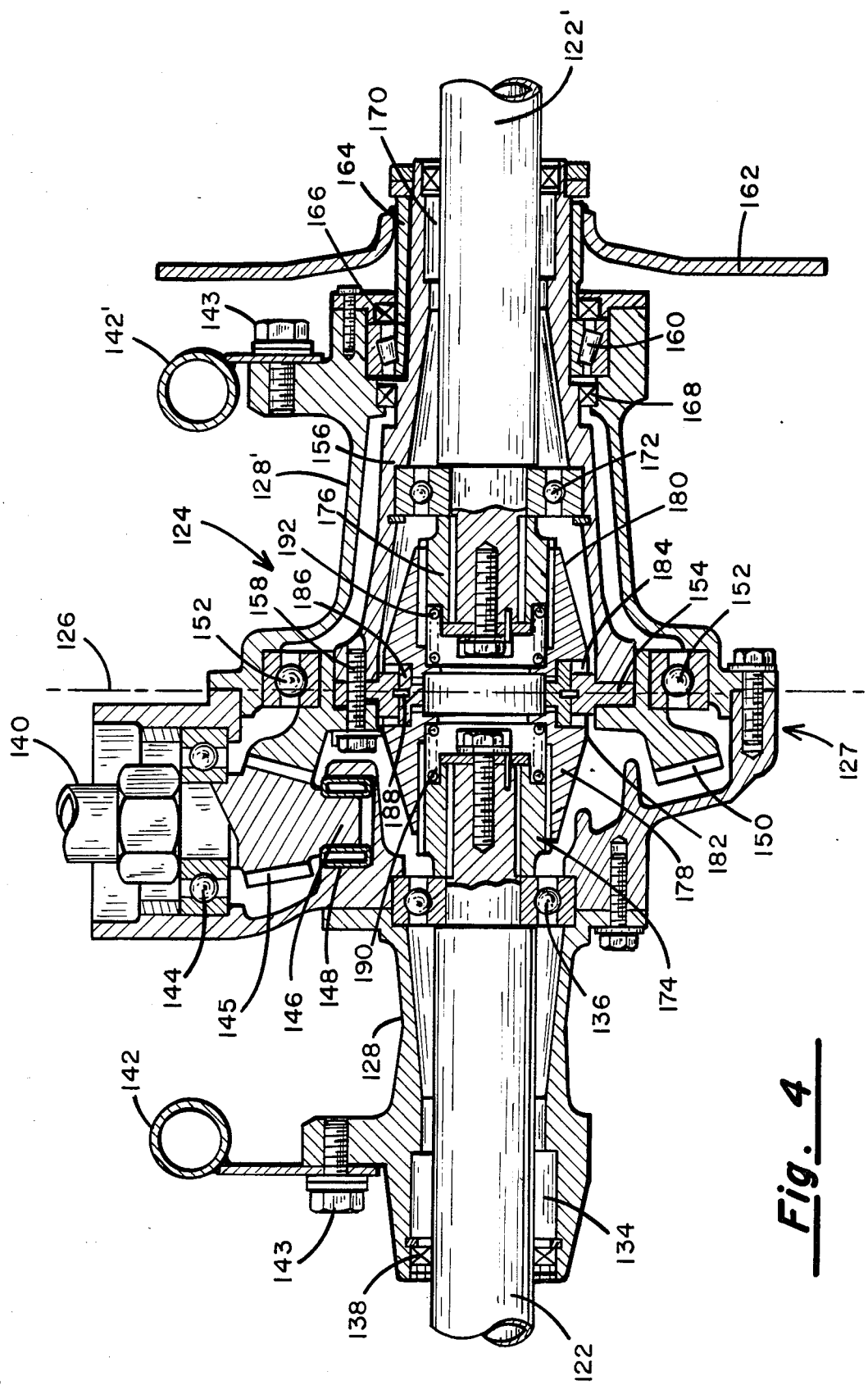
FIG. 4 is a cross-section view of an alternative drive train embodying the present invention.

As will be described in greater detail herein below when the views of FIGS. 3 and 4 are considered, the two rear wheels 20 and 20' are bolted or otherwise affixed to independent axles 22 and 22' which are coupled together through a torque transfer type differential 24 affixed to the frame.

Also supported on the frame is a motor (not shown) which typically may be an internal combustion engine. The engine is disposed generally beneath the driver's seat 26. Fender 28 shields the front wheel and, similarly, rear fenders as at 30 and 30' shield the rear wheels. Typically, a chain drive or a ring gear and pinion drive may be used to couple the motor to the rear wheels through the differential in a manner which will be described with more particularity below.

In that the present invention is primarily concerned with the differential unit used to couple the motor to the rear wheels, it is deemed to be unnecessary to describe in any greater detail the general constructional features of the off-the-road vehicle depicted in FIG. 1.

A first arrangement of a torque transfer type limited differential which is designed for use in the vehicle in FIG. 1 is depicted in the cross-sectional view of FIG. 3. It is indicated generally by numeral 24. The transfer unit is generally symmetrical about a central plane represented by the vertical line 26 and includes a first (left) housing 28 and a second (right) housing 28'. The two housing halves terminate at one end in a circular flange portion 30 and 30' which are bolted to opposed sides of the center unit 32 of the torque transfer differential 24 by means of the bolts 34 which pass through aligned apertures in the flanges 30 and 30' and the center unit 32.

Disposed in the left housing 28 is the left rear axle 22. More specifically, the housing half 28 is generally tubular over a predetermined portion of its length and concentrically located in the tubular portion of the housing is the axle 22. It is journaled for rotation within the housing, there being suitable bushings as at 34 and 36 disposed between the outside surface of the axle and the inside surface of the housing 28. The bushings are lubricated and an end seal 38 is disposed between the housing and the axle to prevent dirt or other foreign material from injuring the bushings.

The left and right housing assemblies 28 and 28' are arranged to be suspended from the frame of the vehicle and to be rotated by the vehicle's engine. Specifically, an annular bearing housing 40 is fixedly attached to the vehicle's frame 42 by means of bolts 44. The housing half 28 passes through the central opening of the bearing housing 40 and disposed between the two is an axle support bearing 44. Seal members 46 and 48 retain the bearing lubricant in place.

Coupled to the outer periphery of the housing 28 by means of a spline coupling is a sprocket support member 50 and bolted to the support member 50 is the sprocket wheel 52. The sprocket wheel 52 has a plurality of spaced teeth on its periphery for mating with a drive chain (not shown) which is used to couple the vehicle's motor to the transfer unit.

From what has been described thus far, it can be seen that as the sprocket 52 is rotated, the housing halves 28 and 28' will also be rotated relative to the frame, the axle support bearings 44 ensuring a smooth rolling contact between these two parts.

A spline coupling is also used to secure a braking means, here shown as disc brake member 54 to the second (right) housing half 28' so that the disc rotates with the housing. Friction applying means in the form of brake calipers (not shown) may be arranged to cooperated with the disc 54 in a fashion which is conventional in such disc brakes assemblies. Alternatively, a drum brake arrangement may be used in place of the disc brake unit. It is to be noted, however, that the drive unit of FIG. 3 only needs one such brake assembly which, in use, becomes available to provide a braking force for both rear wheels. As is known in the art, axles coupled by conventional differential gear boxes must have one brake assembly per axle.

The torque transfer differential 24 of FIG. 3 further includes left and right slide gears 56 and 56' which are provided with a spline coupling at 58 to permit limited axial displacement of the slide gear relative to cam ring 62 and the center unit 32 with which they cooperate. The driven center unit 32 has tooth-like protrusions 61 equally radially spaced in the side face thereof which are arranged to mesh with mating notches formed on the side surfaces of slide gears 56 and 56'. The cam ring 62 includes at least one indexing pin as at 64 which cause it to mate and rotate with the center unit 32. Actually, there is a slot formed in the periphery of the cam ring 62, typically covering about 12° and the pin 64 fits into this slot to permit limited relative rotation between the cam ring 62 and the center unit 32. The position of the cam ring 62 is controlled by either slide gear 56 or 56', depending upon which slide gear is rotating the slower. The slide gears 56 and 56' are biased toward the center unit 32 by means of locking mechanism return springs 66 and 66' which are disposed between shoulders 68 formed on the axles 22 and 22' and the respective slide gears 56 and 56'.

Two snap rings 70 and 70' disposed in the end portions of the axles 22 and 22' facilitate axle assembly against spring pressure applied by return springs 66 and 66'. Further axle support bearings 72 and 72' maintain a proper support to allow the axles to rotate freely within the bushings 34 and 36 and centrally disposed between bearings 72 and 72' axle thrust pin 73 limits the amount of axle movement within the confines of housing 28 and 28'.

While the details of the torque transfer unit have been described in some detail herein, anyone desiring further information concerning the construction and mode of operation of such a unit suitable for use in the present invention may refer to technical data available through Detroit Automotive Products Corporation of Warren, Mich. relating to its line of NoSPIN ® differentials.

The torque transfer unit described above provides positive drive to both wheels while still permitting differential action to take place when turns are made or when road or terrain conditions require. With the type of differential described, the majority of the driving torque will be transmitted to one wheel if the other wheel should lose traction completely. When turning a corner, the outside wheel must rotate faster than the inside wheel, otherwise serious tire scuffing occurs. When making such a turn, the slide gear 56 or 56' associated with the outside wheel automatically becomes disengaged by cam ring 62 and driven clutch ring 60 from the drive center unit 32 against the force of the locking mechanism return spring 66 or 66'. This permits the outside wheel to rotate freely until the turn is completed. When this occurs, the return springs 66 or 66' again force the slide gear 56 or 56' into engagement with the center unit 32, allowing that axle to again be driven.

When the vehicle is being driven across rough terrain where one wheel may lift off the ground or on snow or ice where it may lose traction and spin at a higher angular velocity than the other, all of the torque is transferred to the slower moving wheel. Furthermore, when braking by application of frictional forces to the single disc 54 under these conditions, 100% of the braking force is also applied to the slower moving wheel or evenly distributed when both wheels are rotating at the same angular velocity.

DESCRIPTION OF AN ALTERNATIVE PREFERRED EMBODIMENT

Referring to FIG. 4, there is shown by means of a cross-sectional view an alternative design for a torque transfer type limited differential which allows a solid drive-shaft to be used in coupling the engine output to the transmission. The transfer unit which is indicated generally by numeral 124 is somewhat symmetrical about a central plane represented by the vertical line 126 and includes a frame support housing assembly 127 including a left support housing member 128 and a right support housing 128'. The frame support housing assembly 127 is fastened to the frame 142-142' by means of bolts as at 143.

Disposed in the left support housing 128 is the left rear axle 122. More specifically, the left support housing 128 is generally tubular over a predetermined portion of its length, and concentrically located in the tubular portion of the housing is the axle 122. It is journaled for rotation within the housing, there being suitable bushings as at 134 and by a left axle bearing 136 which are respectively disposed between the outside surface of the axle and the inside surface of the housing 128. The bushing 134 is lubricated and an end seal 138 is disposed between the housing and the axle to prevent dirt or other foreign material from injuring the bushing.

As mentioned, the frame support housing assembly 127 is arranged to be suspended from the frame of the vehicle and a transmission input pinion 140 having gear teeth 145 on a beveled surface thereof is journaled for rotation in the frame support housing assembly 127 by means of bearings 144. The end portion of the transmission input pinion 146 is supported by suitable thrust bearings 148 which allows limited axial movement thereof. The gear teeth 145 on the pinion 140 cooperates with gear teeth on a ring gear 150 which, in turn, is journaled for rotation within the frame support housing assembly 127 by means of the ring gear/disc support bearing 152.

Attached to the ring gear 150 and rotatable therewith is a center unit 154 and a disc support housing 156. These parts are fastened together by means of a bolt as at 158. The disc support housing 156 is journaled for rotation relative to the frame support housing assembly 127 by means of the disc support bearing 160. A brake disc 162 having a hub 164 is coupled to the rightmost end of the disc support housing 156 by way of a splined coupling and, accordingly, is rotatable with the disc support housing itself. Suitable seals at 166 and 168 protect the bearings 160 and maintain the lubricant about the bearing races.

The right axle 122' is journaled for rotation within the disc support housing 156. Specifically, a bushing 170 surrounds the axle 122' proximate the right end of the housing 156 while an axle support bearing 172 supports the leftmost end of the axle 122' within the housing 156. The left and right axles 122 and 122', respectively, are arranged to be driven through axle gears 174 and 176 whose teeth mate with corresponding teeth on the left and right slide gears 178 and 180, respectively. The opposed vertical edges of the slide gears have tooth protrusions as at 182 and 184 which cooperate with teeth formed on the face of a cam ring 186 which turns in unison with the center unit 154 by virtue of the index pins 188 which join the two together. Finally, return springs as at 190 and 192 are disposed between the end surfaces of the axle gears 174 and 176 and the slide gears 178 and 180 to normally urge the slide gears in abutting relationship with the face surfaces of the center unit 154 and the cam ring 186. In that the slide gears are provided with a spline coupling, they are pemitted axial displacement relative to the cam ring with which they cooperate. The driven center unit 154 has tooth-like protrusions equally radially spaced in the side faces thereof which are arranged to mesh with the mating notches formed on the side surfaces of the slide gears 178 and 180.

As with the embodiment of FIG. 3, the torque transfer unit depicted in FIG. 4 provides positive drive to both axles while still permitting differential action to take place when turns are being navigated or when road or terrain conditions dictate. That is to say, the majority of the driving torque will be transmitted to one wheel if the other wheel should lose traction completely. When cornering, the outside wheel necessarily rotates faster than the inside wheel if serious tire scuffing is to be avoided. When making such a turn, the slide gear 178 or 180 associated with the axle of the outside wheel automatically becomes disengaged by cam ring 186 from the center unit 154 against the force of the locking mechanism return springs 190 or 192. This permits the outside wheel to rotate freely until the turn is completed. When this occurs, the return springs again force the appropriate slide gear into engagement with the center unit, allowing that axle to again be driven.

As with the arrangement in FIG. 3, the torque transfer limited differential shown in FIG. 4 allows for enhanced performance when the vehicle is being driven across rough terrain where one wheel may lift off the ground or when being driven on ice or snow where one wheel may lose traction and spin at a higher angular velocity than the other. Under these circumstances, all of the torque is transferred to the slower moving axle. When breaking forces are applied to the disc 162, all of the breaking forces applied to the slower moving wheel or is evenly distributed when both wheels are operating at the same angular velocity.

While there has been shown and described a preferred embodiment of the invention, those skilled in the art will realize ways of modifying the invention in terms of the shape and arrangement of parts and other details. Thus, it is intended that the scope of the invention be determined by the accompanying claims.

I claim:
1. In combination with an off-the-road motor vehicle of the type having a frame and at least one front steerable wheel and a pair of rear wheels rotatably mounted with respect to said frame:
   (a) a torque transfer differential device including a housing at least a portion of which is rotatably journaled to said frame;
   (b) first and second axles, at least one of which is journaled for rotation within said portion of said housing and supported with respect to said frame solely by said housing;
   (c) motor means secured to said frame and drivingly coupled to said housing for rotating same;
   (d) axially displaceable gear means individually splined to said first and second axles and having a plurality of equally spaced protrusions formed on a side surface of said axially displaceable gear means and disposed in said housing for automatically de-coupling the one of said first or second axles from said housing which has the higher rotational velocity at any given time; and
   (e) braking means secured to said rotatable housing and adapted to be engaged by friction-applying means for coupling a braking force through said housing and said axially displaceable gear means to both said first and second axles when said first and second axles are moving at the same angular velocity and to the slower moving one of said first and second axles when said first and second axles are moving at different angular velocities.

2. The combination as in claim 1 wherein said torque transfer differential device further includes:
   (a) a center unit attached to said housing and rotatable therewith, said center unit having a circular opening centrally located therein; and
   (b) cam ring means disposed in said central opening and keyed to said center unit for rotation therewith, said cam ring means having equally spacedd apart notches formed in opposed side surfaces thereof, said notches adapted to receive said spaced protrusions formed on apposed surface of said axially displaceable gear means.

3. The motorized tricycle as in claim 1 wherein said limited differential gear means comprises a torque transfer differential gear means.

4. The combination as in claim 1 wherein said braking means comprises a single radially extending disc fixedly attached to said housing.

* * * * *